US007010004B2

(12) United States Patent
Gazit

(10) Patent No.: US 7,010,004 B2
(45) Date of Patent: Mar. 7, 2006

(54) METHOD FOR MULTIPLEXING DATA FOR PACKET NETWORKS

(75) Inventor: Hillel Gazit, Palo Alto, CA (US)

(73) Assignee: Optibase Ltd., Herzelia (IL)

( * ) Notice: Subject to any disclaimer, the term of this patent is extended or adjusted under 35 U.S.C. 154(b) by 848 days.

(21) Appl. No.: 09/920,865

(22) Filed: Aug. 3, 2001

(65) Prior Publication Data

US 2003/0026276 A1    Feb. 6, 2003

(51) Int. Cl.
*H04J 3/02* (2006.01)
(52) U.S. Cl. ............... 370/537; 370/412; 370/428; 370/468; 370/429
(58) Field of Classification Search ............... 370/412, 370/413, 414, 389, 535, 428, 429, 401, 521, 370/477, 537, 538, 468, 415, 416; 710/51, 710/52, 53, 54
See application file for complete search history.

(56) References Cited

U.S. PATENT DOCUMENTS

| 6,628,652 | B1 * | 9/2003 | Chrin et al. ................. 370/386 |
| 6,665,790 | B1 * | 12/2003 | Glossner et al. ............... 712/4 |
| 6,865,707 | B1 * | 3/2005 | Ernst et al. .................. 714/744 |
| 2002/0064156 | A1 * | 5/2002 | Minkenberg ................. 370/392 |
| 2003/0091043 | A1 * | 5/2003 | Mehrotra et al. ........... 370/389 |

* cited by examiner

*Primary Examiner*—Ajit Patel
(74) *Attorney, Agent, or Firm*—Pearl Cohen Zedek; Latzer, LLP

(57) ABSTRACT

A method of performing the multiplexing of data streams in a packet network by initializing the address pointers in an output queue to point to their own addresses. Then, select a data packet from an input queue and determine whether the preferred location for its pointer in the output queue is occupied. If that location is occupied, go to the address pointed to by the address pointer for that location, and if not occupied, store the pointer to the input stream data in that location.

10 Claims, 8 Drawing Sheets

METHOD FOR MULTIPLEXING DATA FOR PACKET NETWORKS

BACKGROUND OF THE INVENTION

1. Field of the Invention

The present invention, generally, relates to data communication through packet networks and, more particularly, to a method for multiplexing transport stream data or digital uncompressed stream data through an internet protocol network.

To make best possible use of more expensive digital data transmission facilities, as much data as possible must be transferred through the data communications system. This is accomplished, according to the present invention, by multiplexing multiple streams of data into a single data channel for transmission.

Stream data multiplexing includes the process of taking data packets from different streams and putting them into one queue, set to fit a pre-set constant bit rate output, such that:

A.) No packet will be delivered to the output device before its delivery time as derived either by program clock references of the stream in constant bitrate (CBR) or by external time stamps in variable bitrate (VBR).

B.) Any delay in sending data packets to an output device will be minimal.

Timing of the multiplexing operation is a property of the input, where the data packets will be multiplexed in either constant bitrate (CBR) or in variable bitrate (VBR).

2. Description of the Prior Art

One way in the past to merge data packets from multiple streams into a single stream was to use the time associated with each input packet to find an open time slot in the output queue. If any time slot in the output queue has been used, then successive time slots are checked one-by-one in sequence until an open slot is found. A pointer to the input packet then is entered in the open slot found in the output queue.

Another method suggested in the past involves examining all of the streams to be multiplexed and selecting the one with the minimum, ready-to-go, time stamp. Previous efforts to provide a method to multiplex packet data for packet networks have taken different forms.

The prior patents listed hereinafter are examples of these previous efforts.

U.S. Pat. No. 5,862,140 to Shen et al. dated Jan. 19, 1999 describes a method that selects a channel by determining the order of sending data packets into the data stream.

U.S. Pat. No. 5,856,973 to Thompson dated Jan. 5, 1999 describes a method for communicating private application data by either stuffing said data into a header portion of the packets or packetizing it and multiplexing it with other data packets.

U.S. Pat. No. 6,118,786 to Tiernan et al. dated Sep. 12, 2000 describes a method of multiplexing data packets of different time rates involving multiple buffers to avoid buffer overflow.

While these prior arrangements may be effective for their stated purpose, the method of the present invention provides other advantages not available and not even contemplated by any of the prior arrangements.

OBJECTS AND BRIEF SUMMARY OF THE INVENTION

A principal object of the present invention is to provide a method for multiplexing data streams that is both fast and efficient.

It is also an object of the present invention to provide a method that performs the multiplexing of transport data streams with reduced computation.

Briefly, the method of the present invention performs the multiplexing of data streams by initialing address pointers associated with the output queue so that they point to their own addresses. Subsequently, these address pointers are manipulated so as to point to available addresses in accordance with packet data read from various input queues to effect the multiplexing operation.

DETAILED DESCRIPTION OF THE INVENTION

The following terms and definitions are used in the following detailed description.

Address pointer—a pointer to a data storage location within an output queue of data packets.

CBR—constant bitrate which is determined by the packet-rate of the stream bit rate divided by the packet size.

Data pointer—a pointer to an input stream data packet.

Output queue—an array of data pointers.

Output device—a device that sends packets out to the packet network according to the order of pointers in the queue.

PCR—program clock reference

Stream—compressed digital data in MPEG format that may contain any or all of the following: audio packets, video packets, other data packets, and system data packets.

STC—system time clock; the system reference time base.

VBR—variable bitrate which associates every packet; directly or indirectly, with a time stamp.

There are other terms defined in the MPEG-2 specification (ISO/IEC13818-n) that are familiar to those skilled in this art. The address pointer manipulations are based on a mathematical algorithm called union find, the use of which allows the multiplexing operation to be both fast and computationally efficient.

Figure 1:
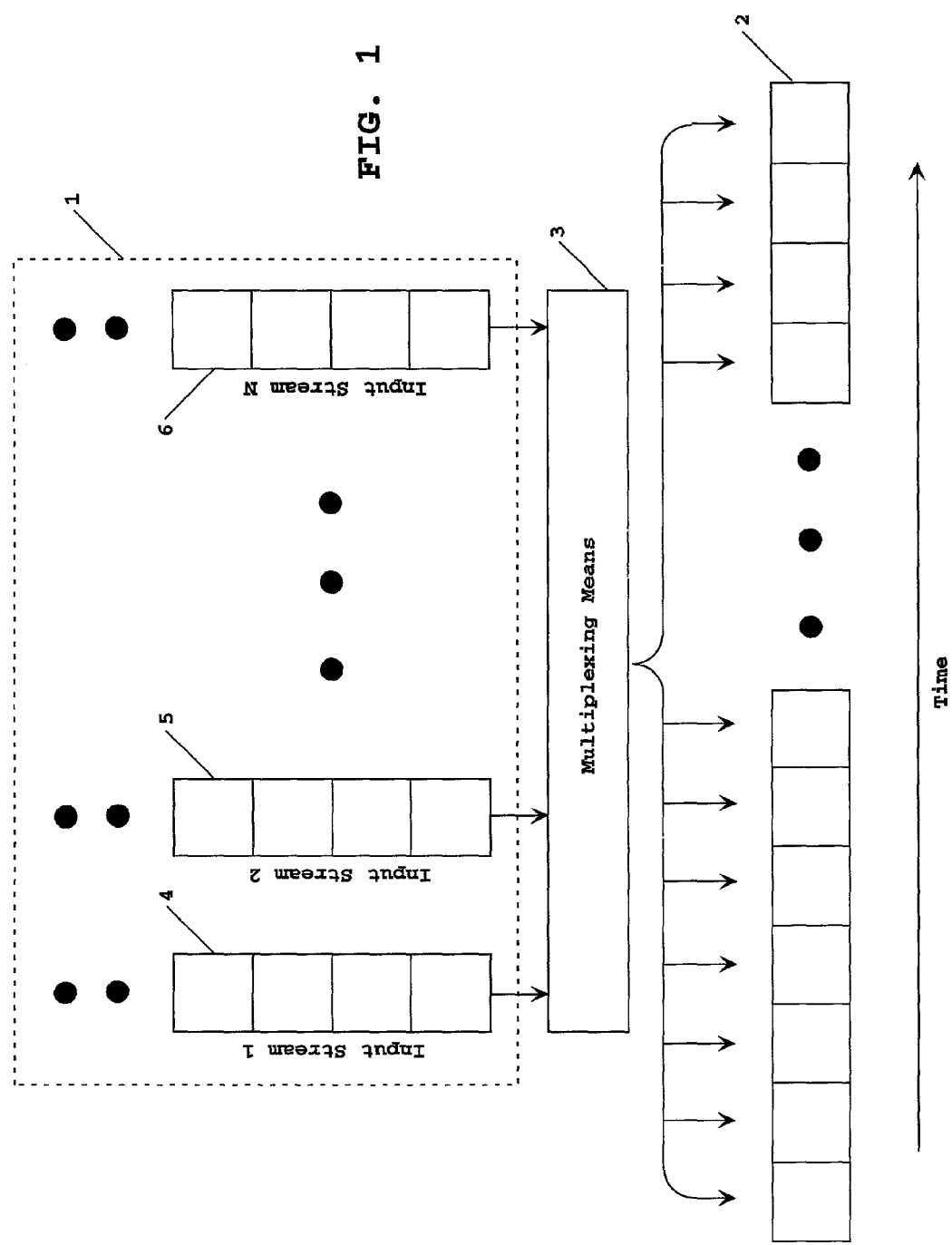
FIG. 1 is an illustration of a multiplexing function.

With reference to FIG. 1, the method of the present invention allows multiple input streams 1 of packetized data to be merged into a single output queue 2 for transmission over an Internet Protocol network. This is accomplished via a multiplexing circuit 3. An algorithm called UNION-FIND, used originally for Fortran compilers in the 1950's, is used by the method of the invention to perform address pointer manipulation for the output queue.

The UNION-FIND algorithm is rarely used today. However, details of the UNION-FIND algorithm are contained in a publication by Aho, Hopcroft, and Ullman, entitled "The Design and Analysis of Computer Algorithms", published by Addison-Wesley Publishing Co.

In the UNION-FIND algorithm, the computation necessary to multiplex one data packet rises less than the log* of the number of packets in the section. (log* of numbers smaller than 65536 is less than 4, log* of numbers smaller than 2**65536 is less than 5). Thus, the UNION-FIND algorithm is simple and efficient.

Initialization

Figure 2:
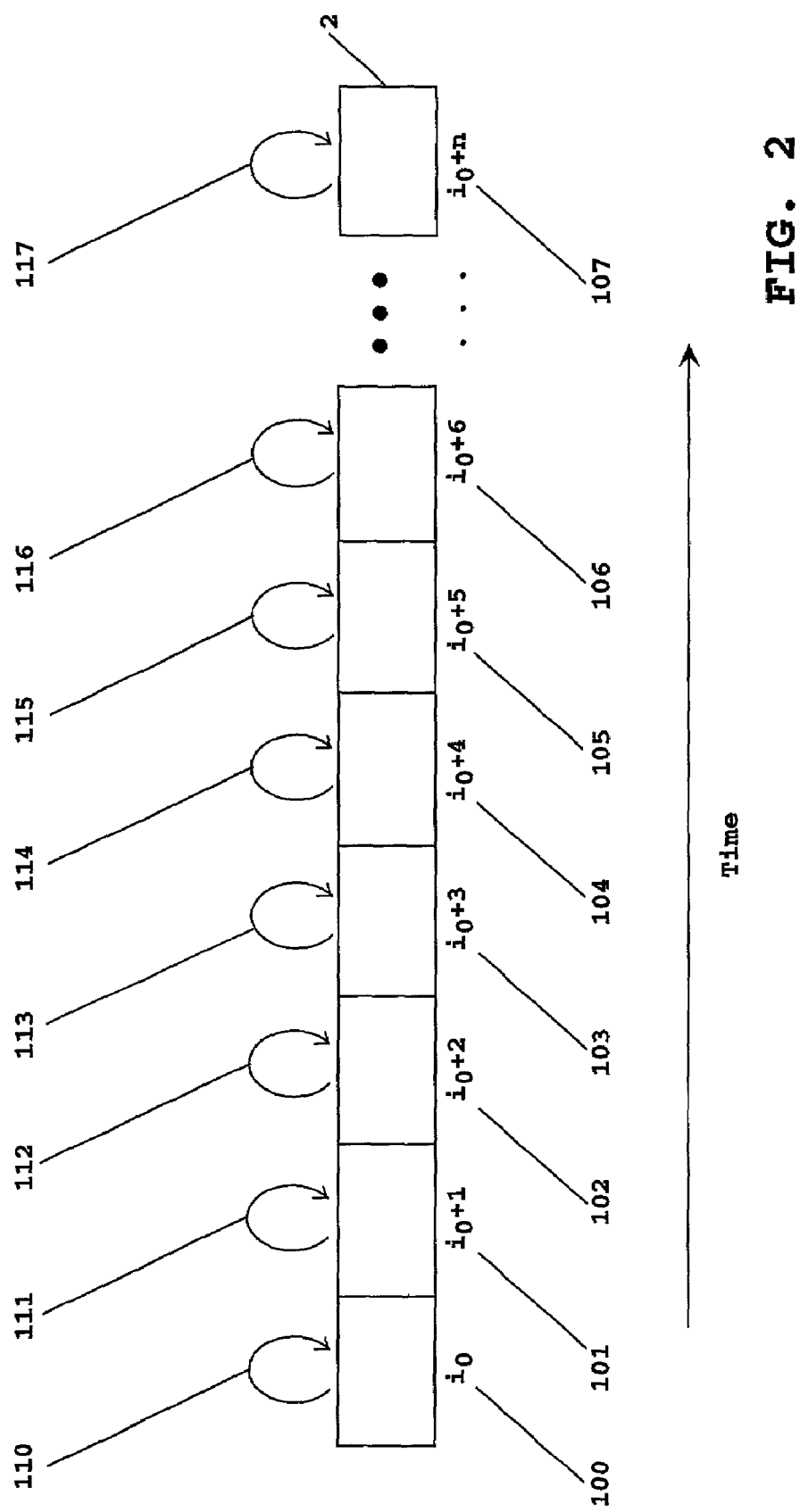
FIG. 2 is an illustration of an output queue section that has been initialized.

With reference to FIG. 2 of the drawings, a series of address pointers 110 through 117, represented by an array called unionFind, point to various locations in one section to the output queue 2. Before a particular section of this output queue 2 can be used, however, the address pointers 110 through 117 must be initialized.

In a unionFind array of the UNION-FIND algorithm, a location is empty if the address pointer 110 through 117 for a location points to itself, i.e., location "i" is empty if unionFind[i]==I.

Therefore, the unionFind array is initialized by forcing all address pointers 110 through 117 to point to their own location.

The various locations in the output queue are $i_0-(i_0+n)$ 100 through 107 that point to data in one of the input streams 4, 5, 6.

The size of an array of a section is determined as follows:

Array size=size+MaxT

Where:
size=the number of packets in the section to be filled.
MaxT=maximum possible time difference for packets of the same stream.

The first size places of the array are re-initialized after each multiplexing and output operation of each section.

Multiplexing Operation

Referring again to FIG. 1, the multiplexing operation begins by selecting the input stream 4. Pointers to data representing 50 msec of data from the selected input stream are routed through the multiplexing circuit 3 to the output queue 2. Once the data pointers for input stream 4 are written into the output queue 2, the input stream 5 is selected, and the process is repeated using the data pointers for the input stream 5.

The operation is repeated until data representing 50 msec of data from each input stream 1 is processed. Then the cycle repeats starting again with the input stream 4.

The method of the present invention incorporates the following rules which must be followed when choosing a particular location within the range of locations $i_0$ 100 to $i_0+n$ 107 in the output queue 2 to store a data pointer:
1) a new data pointer entry must not overwrite an existing data pointer.
2) data pointer entries must not be presented to the output device before its time as indicated by the associated time stamp.
3) any delay in sending data packets to the output device should be minimal.
4) only the address pointers from the desired insertion point forward in time on the directed path are modified.
5) the order of the packets is preserved.

The FIGS. 3, 4, 5, 6, and 7 of the drawings are illustrations of various situations that can exist when a data pointer is added to the output queue 2. Additions to the output queue 2 and the method of the present invention with regard to manipulating the address pointers 110 through 117 for each of those additions, are described for each case below.

In the case descriptions that follow, data pointers A 120, B 121, C 122, D 123, and E 124 are stored in the output queue. The address pointer manipulations vary depending upon prior additions to the output queue 2, if any. Each data pointer points to a packet of data in one of the input data streams 1. Each packet contains either compressed or uncompressed data of 188 bytes.

Case 1

In FIG. 2 of the drawings, case 1 illustrates the address manipulation performed when a data pointer is added to a previously initialized output queue 2.

Figure 3:
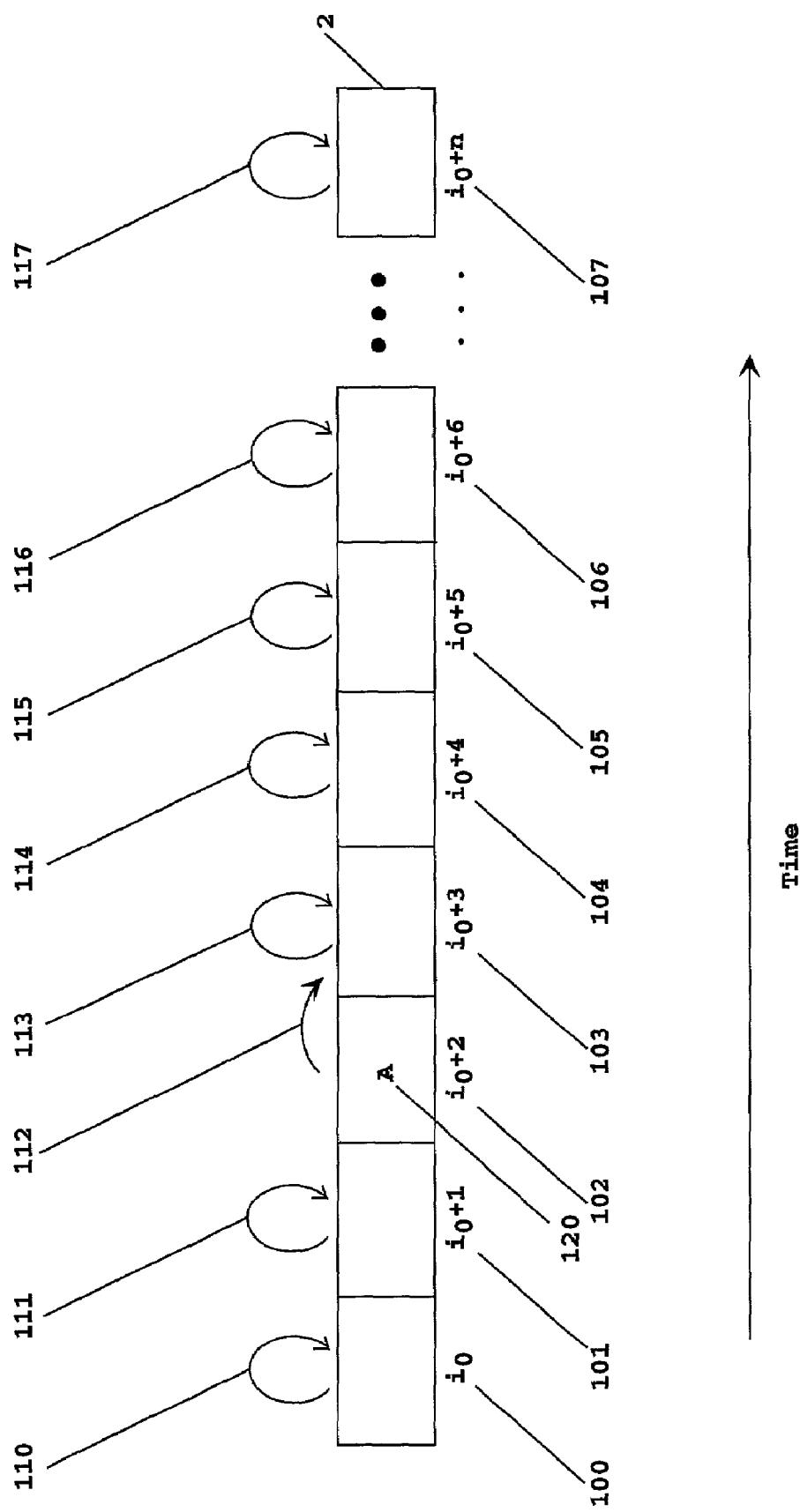
FIG. 3 is an illustration of the output queue section of FIG. 2 following a data pointer "A" insertion, described hereinafter.

With reference to FIG. 3, data pointer A 120 is added to the output queue. The data pointer A 120 has a time stamp corresponding to the output queue address $i_0+2$ 102.

Since location $i_0+2$ 102 was unoccupied, the data pointer A 120 is stored in location $i_0+2$ 102 and the associated address pointer 112 is changed to point to the next unoccupied location; in this case, the location $i_0+3$ 103. Thus, the subsequent entries that are attempted at the location $i_0+2$ 102 will be re-directed to the location $i_0+3$ 103.

Case 2

In FIG. 3, the address manipulation performed when a data pointer is added to an un-occupied location in an existing output queue 2 that has an un-occupied location immediately following the preferred location.

Figure 4:
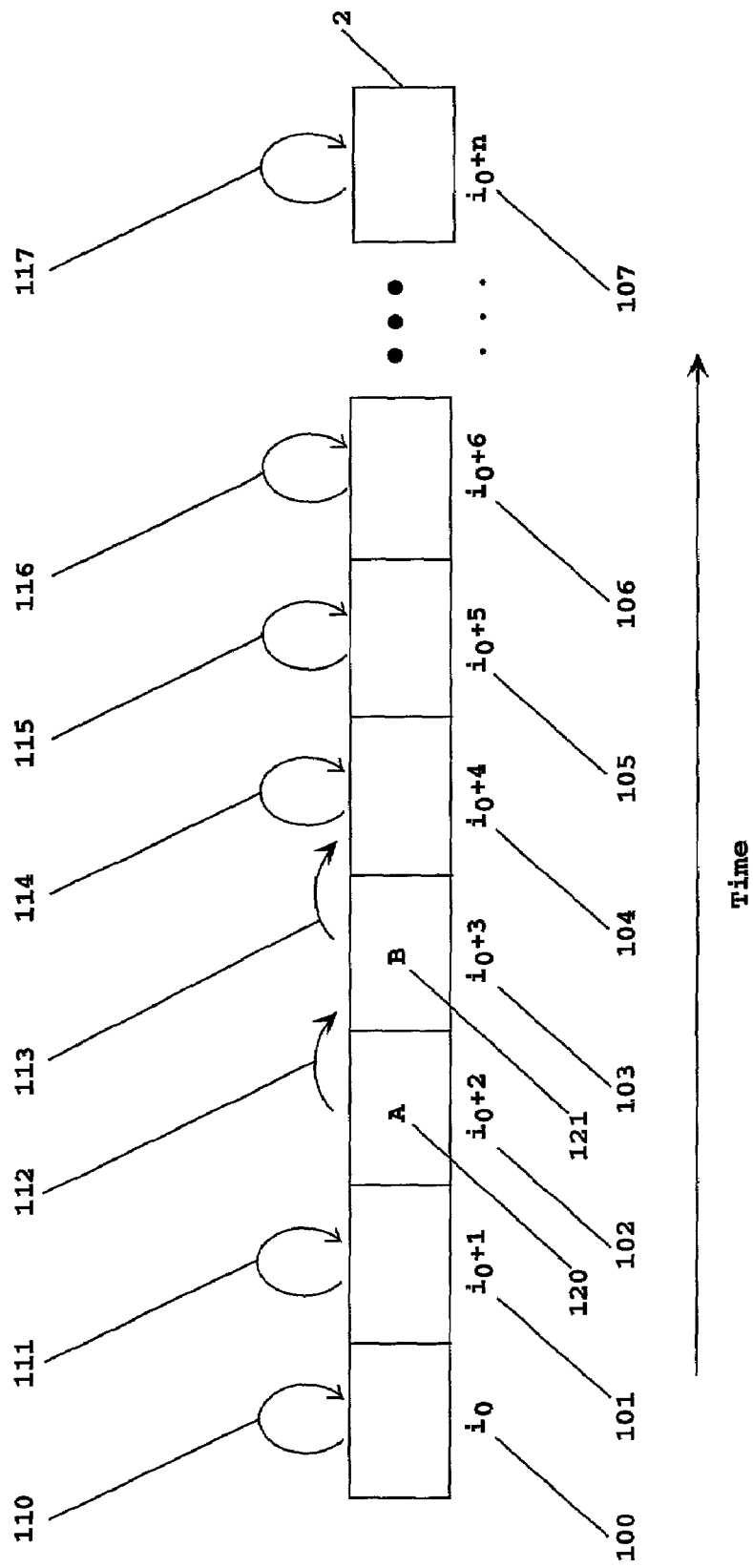
FIG. 4 is an illustration of the output queue section following a data pointer "B" insertion.

With reference to FIG. 4, data pointer B 121 is added to the output queue 2. The data pointer B 121 has a time stamp corresponding to the output queue address $i_0+3$ 103.

Since the location $i_0+3$ 103 was unoccupied, data pointer B 121 is stored in location $i_0+3$ 103 and the associated address pointer 113 is changed to point to the next unoccupied location; in this case, location $i_0+4$ 104. Thus, subsequent entries that are attempted at the location $i_0+3$ 103 will be re-directed to the location $i_0+4$ 104.

Case 3

In FIG. 4 of the drawings, the address manipulation that is performed occurs when a data pointer is added at an occupied location in an existing output queue 2 that has an occupied location immediately following the preferred location.

Figure 5:
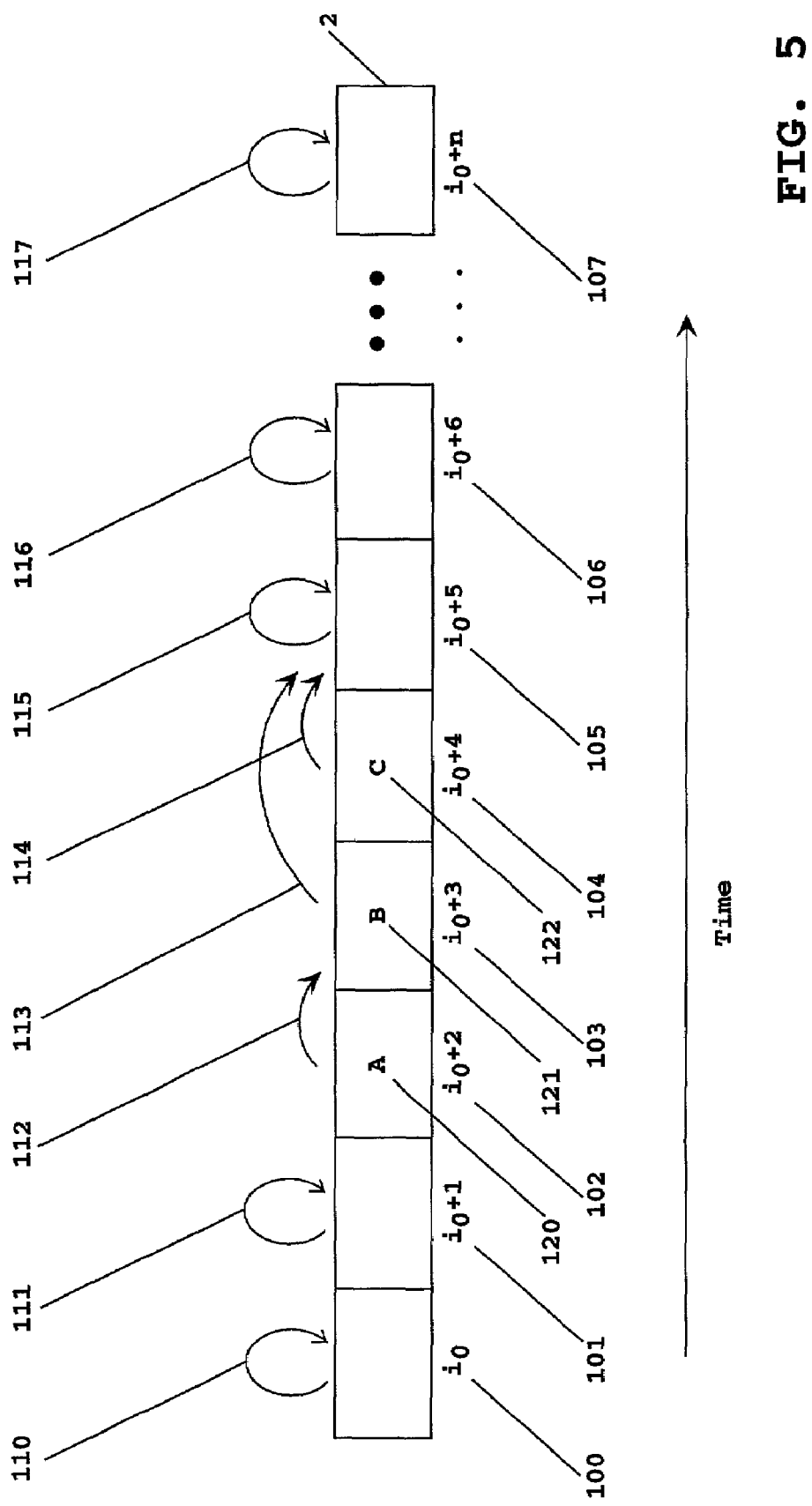
FIG. 5 is an illustration of the output queue section following a data pointer "C" insertion.

With reference to FIG. 5, the data pointer C 122 is added to the output queue.

The data pointer C 122 has a time stamp corresponding to output queue address $i_0+3$ 103. Since the location $i_0+3$ 103 is occupied, the data pointer C 122 is stored in the location $i_0+4$ 104 and the address pointers 113 and 114 are both changed to point to the next unoccupied location; in this case, the location $i_0+5$ 105.

Thus, subsequent entries that are attempted at the locations $i_0+3$ 103 or $i_0+4$ 104 will be re-directed to the location $i_0+5$ 105.

Case 4

Assuming the situation shown in FIG. 5, case 4 illustrates the address manipulation performed when a data pointer is added to an occupied location in an existing output queue 2 that has several occupied locations immediately following the preferred location.

Figure 6:
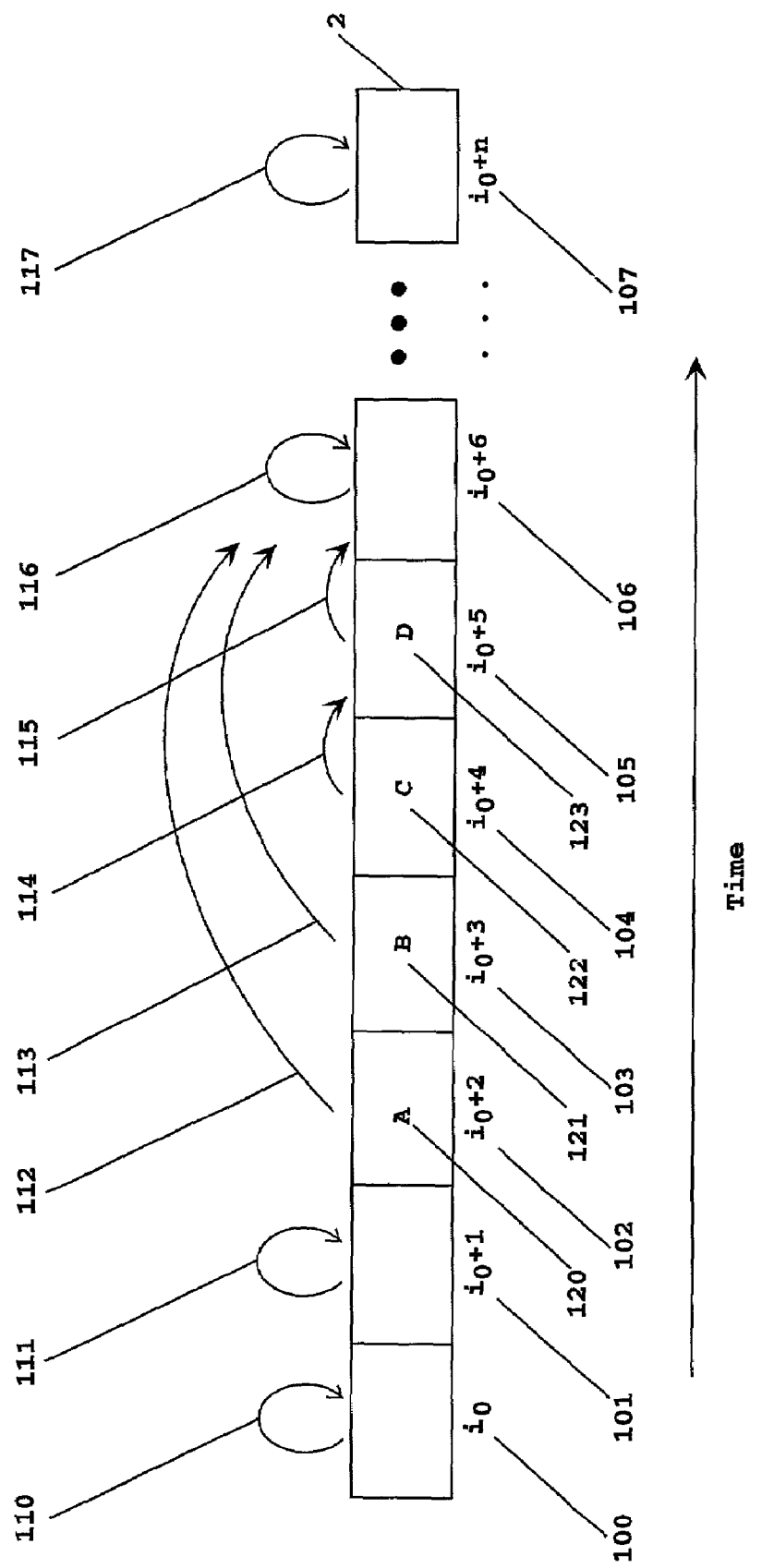
FIG. 6 is an illustration of the output queue section following a data pointer "D" insertion.

With reference to FIG. 6, the data pointer D 123 is added to the output queue. For this case, the data pointer D 123 has a time stamp corresponding to the output queue address $i_0+2$ 102.

Since the location $i_0+2$ 102 is occupied, the data pointer D 123 is stored in location $i_0+5$ 105 and the associated address pointers 112, 113, and 115 are changed to point to the next unoccupied location; in this case, location $i_0+6$ 106. Thus, subsequent entries that are attempted at locations $i_0+2$ 102, $i_0+3$ 103, or $i_0+5$ 105 will be re-directed to the location $i_0+6$ 106.

The address pointer 114 is not changed since it is not on the directed path from the desired insertion point.

Case 5

For case 5, the address manipulation performed is illustrated in FIG. 6 for a data pointer to be added at an un-occupied location in an existing output queue 2 with several occupied locations immediately following the preferred location.

Figure 7:
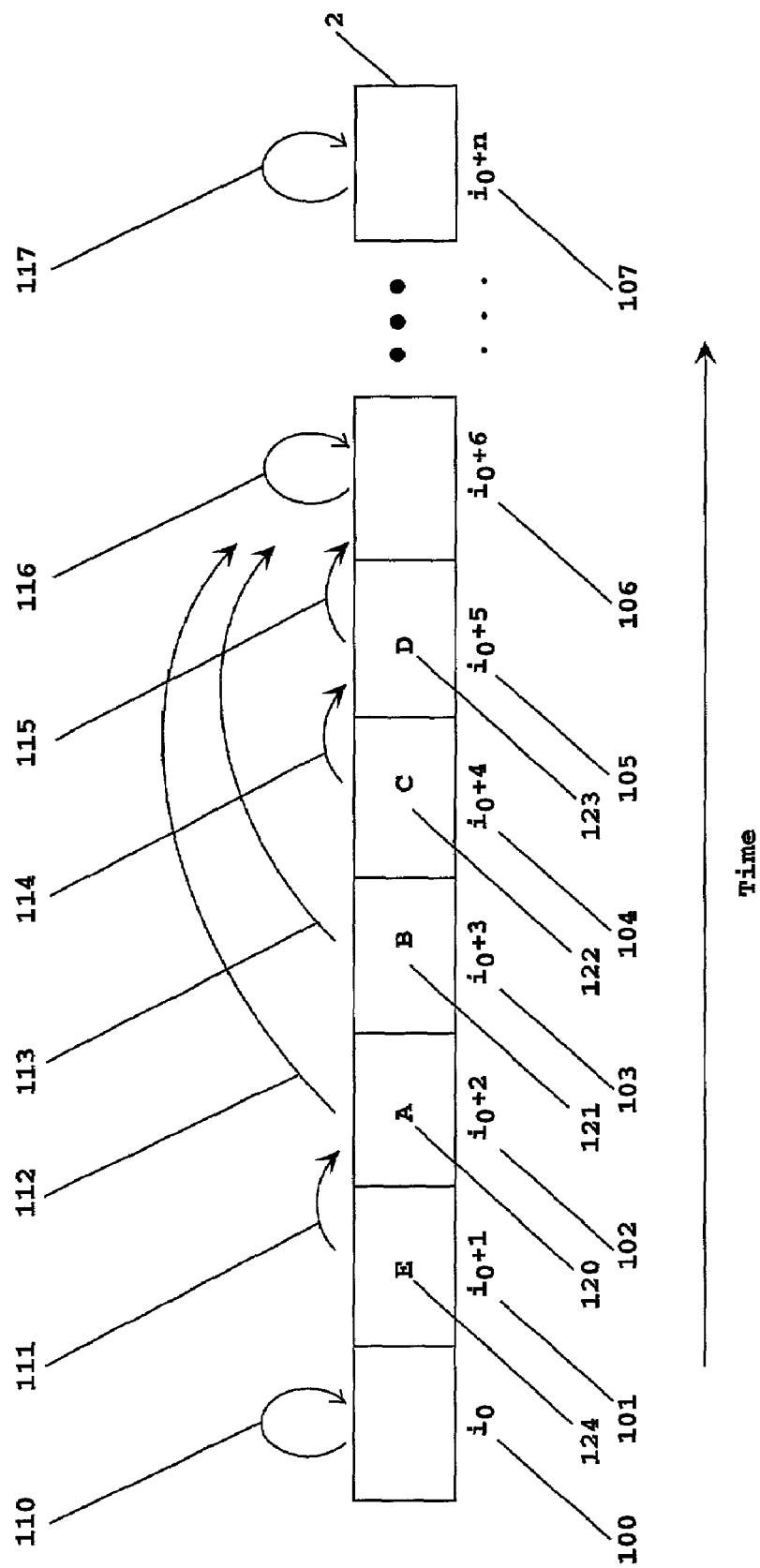
FIG. 7 is an illustration of the output queue section following a data pointer "E" insertion.

With reference to FIG. 7, the data pointer E 124 is added to the output queue. For this case, it is assumed data pointer E 124 has a time stamp corresponding to output queue address $i_0+1$ 101.

Since location $i_0+1$ 101 was unoccupied, data pointer E 124 is stored in location $i_0+1$ 101, and the associated address pointer 111 is changed to point to the next unoccupied location; in this case, location $i_0+2$ 102. Thus, subsequent entries that are attempted, the location $i_0+1$ 101 will be re-directed to the location $i_0+2$ 102.

Figure 8:
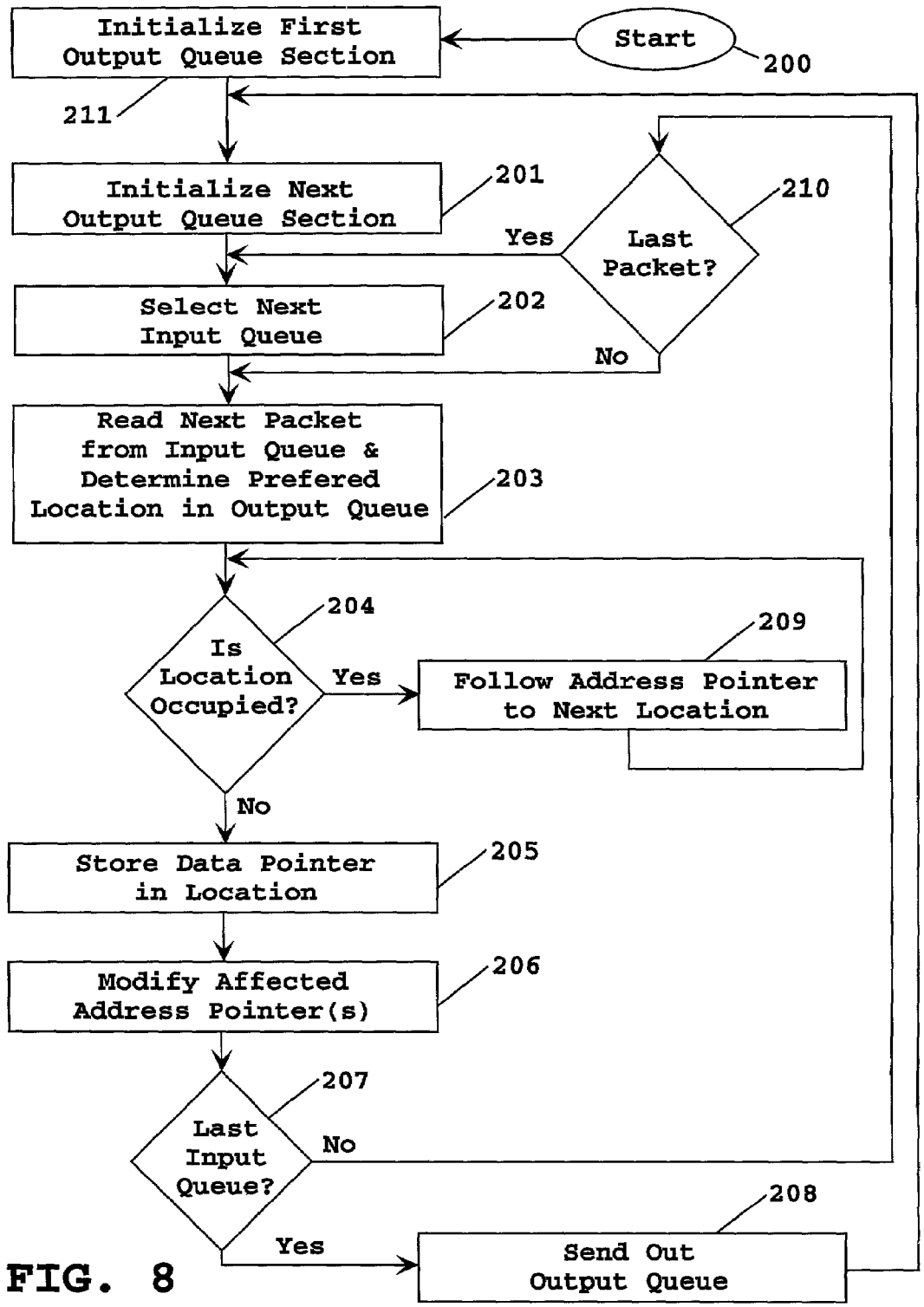
FIG. 8 is a flow chart used as an aid in describing the data multiplexing algorithm of the present invention.

The flow chart in FIG. 8 is a data multiplexing algorithm that illustrates the method of the present invention, which includes the steps of:

1) Using Initialize First Output Queue Section 211, make all address pointers in that section to point to their own addresses.
2) Set the next input queue equal to the Input Stream 1 and initialize the next section of the output queue by making all address pointers point to their own addresses using the Initialize Next Output Queue Section 201.
3) Selecting the next input queue using the Select Next Input Queue 202.
4) Read the next packet from the input queue and determine the preferred location for it in the output queue using the Read Next Packet from the Input Queue & Determine Preferred Location in Output Queue 203.
5) Determine whether the preferred location in the output queue is occupied by examining the address pointer for that location using the Is Location Occupied? 204.
6) If the location is occupied, go to the address pointed to by the address pointer for that location using the Follow Address Pointer to Next Location 205.
7) If the location is not occupied, store the pointer to the input stream data in the location using the Store Data Pointer in Location 206.
8) Modify all output queue addresses accessed by steps 3 and 5 to point to the next unoccupied location in the output queue using the Modify Affected Address Pointer(s) 207.
9) Determine whether this is the last input queue using the Last Input Queue? 208.
10) If this is the last input queue, transmit the output queue using the Send Out Output Queue 209.
11) If this is not the last input queue, determine whether this is the last packet in the selected input queue using the Last Packet? 210.
12) If this is the last packet in the selected input queue, go to step 2.
13) If this is not the last packet in the selected input queue, go to step 3.

A mathematical expression of the above method is as follows:

To find a location within the range of locations $i_0$ 100 to $i_0+n$ 107 in the output queue 2 such that i>=k, then the operation is as follows:

```
int findEmptySpace(int *unionFind, int k, int size)
{
int i, j;
int l;
i=k;
while ((j=unionFind[i])!=i)
{
i=j;
}
l=i+1;
while ((j=unionFind[k])!=k)
{
unionFind[k]=l;
k=j;
}
if (i>size) return STREAM_DONE;
unionFind[i]=l;
return i;
}
```

Where k=the time stamp associated with the data pointer to be stored in the output queue 2.

The path from the preferred data pointer insertion point to the actual data pointer insertion point is traversed twice; once to follow the path directed by the address pointers 110 through 117 to find an unoccupied location in the range of locations $i_0$ 100 through $i_0+n$ 107 and once to update address pointers 110 through 117 that are affected by the data pointer insertion.

The stream selection progresses sequentially through the remaining input streams, and then, repeats.

This array-based implementation has an advantage over a tree-based implementation in that it minimizes the number of unused locations. If the multiplexing circuit 3 is not over-committed, usually the largest contiguous section of unused memory is, at most, equal to the number of streams.

As a result, the algorithm usually will use only one or two pages of memory. Also, since computations are performed one input stream 1 at a time, subsequent searches for an empty location start close to where the last search stopped.

The preferred implementation of the method of the present invention is in software that runs on a general purpose microprocessor. An Intel Pentium microprocessor is a suitable microprocessor.

A substantial advantage of the method of the present invention is achieved on a microprocessor embedded with limited cache memory, such as the i960.

While the presently preferred embodiment of the invention has been described in substantial detail, it is to be understood that the invention is not limited by the embodiment described, but rather, the invention is intended to include various modifications and the various equivalents that are covered by the spirit and scope of the appended claims.

What is claimed is:

1. A method for multiplexing data in a packet network system with a plurality of data queues, said method comprising the steps:

a) initialize a first output queue section by making all address pointers in that section point to their own addresses;
b) initialize said system by setting an input queue equal to a first input stream and initialize a next section of its output queue by making all address pointers in that output queue point to their own addresses;
c) select the next input queue;
d) read a next packet from said next input queue and select a location for it in said output queue;
e) determine whether said selected location in said output queue is occupied by examining its address pointer;
f) if said selected location is occupied, select in its stead a new location pointed to by the address pointer for said selected location and repeat until the lastly selected location is not occupied;
g) store the pointer to said next packet in the lastly selected location;
h) modify the address pointers for all output queue locations examined in step f to point to the first unoccupied location in the output queue that is beyond the location accessed in step g;
i) go to step c and repeat until the last input queue in said plurality of data queues is multiplexed.

2. The method of claim 1 wherein the packet network is an Internet Protocol network.

3. The method of claim 2 wherein the data is MPEG-2 transport stream data.

4. The method of claim 2 wherein the data is digital uncompressed stream data.

5. The method of claim 2 wherein the data is digital compressed stream data.

6. A method for multiplexing data in a packet network system with a plurality of data queues, said method comprising the steps:
a) initialize a first output queue section by making all address pointers in that section point to their own addresses;
b) initialize said system by setting an input queue equal to a first input stream and initialize a next section of its output queue by making all address pointers in that output queue point to their own addresses;
c) select the next input queue;
d) read a next packet from said next input queue and select a location for it in said output queue;
e) determine whether said selected location in said output queue is occupied by examining its address pointer;
f) if said selected location is occupied, select in its stead a new location pointed to by the address pointer for said selected location and repeat until the lastly selected location is not occupied;
g) store the pointer to said next packet in the lastly selected location;
h) modify the address pointers for all output queue locations examined in step f to point to the first unoccupied location in the output queue that is beyond the location accessed in step g;
i) determining whether this is the last input queue;
j) if this is the last input queue, send out the output queue;
k) if this is not the last input queue, determine whether this is the last packet in the selected input queue;
l) if this is the last packet in the selected input queue, go to step c; and
m) if this is not the last packet in the selected input queue, go to step d.

7. The method of claim 6 wherein the packet network is an Internet Protocol network.

8. The method of claim 7 wherein the data is MPEG-2 transport stream data.

9. The method of claim 7 wherein the data is digital uncompressed stream data.

10. The method of claim 7 wherein the data is digital compressed stream data.

* * * * *